(12) United States Patent
Zhang et al.

(10) Patent No.: US 11,741,615 B2
(45) Date of Patent: Aug. 29, 2023

(54) MAP SEGMENTATION METHOD AND DEVICE, MOTION ESTIMATION METHOD, AND DEVICE TERMINAL

(71) Applicant: Zhejiang University, Hangzhou (CN)

(72) Inventors: Yu Zhang, Hangzhou (CN); Weichen Dai, Hangzhou (CN); Jiajun Jiang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 246 days.

(21) Appl. No.: 17/221,063

(22) Filed: Apr. 2, 2021

(65) Prior Publication Data

US 2021/0312637 A1 Oct. 7, 2021

(30) Foreign Application Priority Data

Apr. 3, 2020 (CN) .......................... 202010259485.1

(51) Int. Cl.
*G06T 7/162* (2017.01)
*G06T 7/136* (2017.01)
(Continued)

(52) U.S. Cl.
CPC .............. *G06T 7/162* (2017.01); *G06T 7/136* (2017.01); *G06T 7/246* (2017.01); *G06T 7/73* (2017.01);
(Continued)

(58) Field of Classification Search
CPC ......... G06T 7/162; G06T 7/136; G06T 7/246; G06T 7/73; G06T 2207/20072;
(Continued)

(56) References Cited

U.S. PATENT DOCUMENTS

2013/0188869 A1* 7/2013 Yoo .......................... G06T 7/11
382/173

OTHER PUBLICATIONS

Dai, Weichen et al., "RGB-D SLAM in Dynamic Environments Using Point Correlations", arXiv, arXiv:1811.03217v1 [cs.CV] Nov. 8, 2018 (Year: 2018).*

(Continued)

*Primary Examiner* — Chan S Park
*Assistant Examiner* — Daniel C Chang
(74) *Attorney, Agent, or Firm* — Rossi, Kimms & McDowell LLP

(57) ABSTRACT

A map segmentation method and device, a motion estimation method, and a device terminal. Obtaining all map point data and constructing a corresponding graph based on these map points, where the graph includes each node formed by map points and corresponding edges; measuring and estimating to-be-estimated state variables corresponding to the node to obtain a corresponding measured and estimated value, where the to-be-estimated state variables include homogeneous coordinates of the node and a corresponding sensor pose upon node obtaining; calculating an inter-point correlation between any two adjacent nodes in the graph based on the measured and estimated value to determine whether the inter-point correlation is less than a preset correlation threshold; and when the inter-point correlation is less than the preset correlation threshold, removing an edge corresponding to the corresponding adjacent nodes, to separate the static points and the dynamic points and complete map segmentation.

11 Claims, 2 Drawing Sheets

(51) Int. Cl.
 *G06T 7/246* (2017.01)
 *G06T 7/73* (2017.01)
(52) U.S. Cl.
 CPC .............. *G06T 2207/20072* (2013.01); *G06T 2207/20076* (2013.01); *G06T 2207/30244* (2013.01)
(58) Field of Classification Search
 CPC . G06T 2207/20076; G06T 2207/30244; G06T 2207/10024; G06T 2207/10028; G06T 7/11; G06T 7/187; G06T 7/215; G06T 7/70; G06T 2207/10004
 See application file for complete search history.

(56) References Cited

OTHER PUBLICATIONS

Timothy D. Barfoot, "State Estimation for Robotics", Cambridge University Press, 2018 (Year: 2018).*

* cited by examiner

MAP SEGMENTATION METHOD AND DEVICE, MOTION ESTIMATION METHOD, AND DEVICE TERMINAL

TECHNICAL FIELD

The present disclosure relates to the field of image processing, and in particular, to a map segmentation method and device, a motion estimation method, and a device terminal.

BACKGROUND

Vision-based motion estimation methods can use time-series images to estimate the 6-degree-of-freedom ego-motion of the sensor. However, the application scenarios of these motion estimation methods are strictly subject to static environment assumptions. In practical applications, the estimation accuracy of the vision-based motion estimation methods with static environment assumptions is reduced due to the presence of moving interfering objects in the field of view.

SUMMARY

The present disclosure provides a map segmentation method and device, a motion estimation method, and a device terminal. For a map containing dynamic scenes, based on the idea that there is a distribution correlation between static points while there is no correlation between dynamic points and static points, edges between uncorrelated points are removed to separate the dynamic points from the static points and complete map segmentation. Using static data points for motion estimation eliminates the dynamic points' impact and lays the foundation for motion estimation in dynamic environments.

A map segmentation method is provided, where a map includes static points and dynamic points, and the map segmentation method includes:

obtaining all map point data and constructing a graph based on these map points, where the graph includes nodes formed by map points and corresponding edges;

measuring and estimating to-be-estimated state variables corresponding to each node in the graph to obtain a corresponding measured and estimated value, where the to-be-estimated state variables include homogeneous coordinates of the node and a corresponding sensor pose upon node obtaining;

calculating an inter-point correlation between any two adjacent nodes in the graph based on the measured and estimated value;

determining whether the inter-point correlation is less than a preset correlation threshold; and when the inter-point correlation is less than the preset correlation threshold, removing an edge corresponding to the corresponding adjacent nodes to separate the static points from the dynamic points and complete the map segmentation.

In an embodiment, the obtaining all map point data and constructing a corresponding graph based on these map points includes:

performing feature point extraction and feature point matching on input sensor data to obtain map point data;

using a triangulation method to process the map point data to construct a corresponding graph.

In an embodiment, a formula for calculating the measured and estimated value is as follows:

$$\begin{cases} y_{ik} = g(X_{ik}) + n_{ik} = s(R(X_{ik})) + n_{ik} \\ R(X_{ik}) = T_k * P_i \\ X_{ik} = \{T_k, P_i\} \end{cases}$$

where $y_{ik}$ represents a measured and estimated value corresponding to the i-th map point in the graph at time k; s(.) represents a sensor model; R(.) is used for transformation from a world coordinate system to a sensor coordinate system; $g(X_{ik})=s(R(X_{ik}))$ represents a model observation value obtained when the sensor model is used to observe the i-th map point at time k; $X_{ik}$ represents a to-be-estimated state variable corresponding to the i-th map point at time k; $T_k$ represents a motion of a sensor at time k; $P_i$ represents homogeneous coordinates corresponding to the i-th map point; $n_{ik}$ represents Gaussian noise; $n_{ik}$ meets Gaussian distribution $N(u_{ik}, C_{ik})$; $u_{ik}$ represents a mean value of Gaussian noise; and $C_{ik}$ represents a variance of Gaussian noise, where i and k are both positive integers.

In an embodiment, the map segmentation method further includes:

when the sensor model is used for observation, using a maximum likelihood estimation method to observe the state variable.

In an embodiment, the following calculation formula is used in the step of calculating an inter-point correlation between any two adjacent nodes in the graph based on the measured and estimated value:

$$\begin{cases} Z_{ijk} = y_{ik} - y_{jk} = h(l_{ijk}) + n_{ijk} \\ h(l_{ijk}) = s(T_k * P_i) - s(T_k * P_j) \end{cases}$$

where $Z_{ijk}$ represents an inter-point correlation between the i-th map point and the j-th map point in the graph at time k; $y_{jk}$ represents a measured and estimated value corresponding to the j-th map point in the graph at time k; $l_{ijk}$ represents an edge connecting the i-th map point and the j-th map point at time k; $h(l_{ijk})$ represents a model observation value corresponding to the inter-point correlation between the i-th map point and the j-th map point at time k; $P_j$ represents homogeneous coordinates corresponding to the j-th map point; and $n_{ijk}$ represents noise.

In an embodiment, a method for solving an extreme value of a preset objective function is used to optimize a measurement error of the to-be-estimated state variable and a model observation error of the inter-point correlation, where the preset objective function is as follows:

$$\begin{cases} J(X) = \frac{1}{2}\sum_{i,k} e_{y,ik}(X)^T C_{ik}^{-1} e_{y,ik}(X) + \frac{1}{2}\sum_{ij,k} e_{z,ijk}(l_{ijk})^T C_{ijk}^{-1} e_{z,ijk}(l_{ijk}) \\ e_{y,ik}(X) = y_{ik} - g(X_{ik}), e_{z,ijk}(X_g) = Z_{ijk} - h(l_{ijk}) \end{cases}$$

where J(X) represents the preset objective function; $e_{y,ik}(X)$ represents the measurement error of the to-be-estimated state variable; $e_{z,ijk}(X_g)$ represents the model observation error of the inter-point correlation; $C_{ijk}$ is a covariance of $Z_{ijk}$; X represents the to-be-estimated state variable; and $X_g$ represents homogeneous coordinates in the to-be-estimated state variable.

A motion estimation method is further provided, where the motion estimation method adopts the above map segmentation method, and the motion estimation method further includes:

determining a connected domain of each part in the segmented map;

selecting a connected domain with the largest volume from all the connected domains as a target static point set; and processing the target static point set to complete motion estimation.

A map segmentation device is further provided, where a map includes static points and dynamic points, and the map segmentation device includes:

a graph generation module, configured to construct a corresponding graph based on map point data, where the graph includes nodes formed by map points and corresponding edges;

a measurement module, configured to measure and estimate to-be-estimated state variables corresponding to each node in the graph to obtain a corresponding measured and estimated value, where the to-be-estimated state variables include homogeneous coordinates of the node and a corresponding sensor pose upon node obtaining;

an inter-point correlation calculation module, configured to calculate an inter-point correlation between any two adjacent nodes in the graph based on the measured and estimated value;

a correlation determining module, configured to determine whether the inter-point correlation is less than a preset correlation threshold; and a segmentation module, configured to: when the inter-point correlation is less than the preset correlation threshold, remove an edge corresponding to the corresponding adjacent nodes to separate the static points from the dynamic points and complete the map segmentation.

A device terminal includes a memory and a processor, where the memory is configured to store a computer program, and the processor runs the computer program to enable the device terminal to execute the above map segmentation method.

A readable storage medium is further provided, where the readable storage medium stores a computer program, and when being executed by a processor, the computer program executes the above map segmentation method.

The map includes static points and dynamic points. In the foregoing map segmentation method, map point data is obtained, and a corresponding graph is constructed based on the map point data, where the graph includes nodes formed by map points and corresponding edges; to-be-estimated state variables corresponding to each node are measured and estimated to obtain a corresponding measured and estimated value, where the to-be-estimated state variables include homogeneous coordinates of the node and a corresponding sensor pose upon node obtaining; an inter-point correlation between any two adjacent nodes in the graph is calculated based on the measured and estimated value to determine whether the inter-point correlation is less than a preset correlation threshold; and when the inter-point correlation is less than the preset correlation threshold, an edge corresponding to the corresponding adjacent nodes is removed, to separate the static points and the dynamic points. In this way, based on the idea that there is a distribution correlation between static points while there is no correlation between dynamic points and static points, edges between uncorrelated points are removed, thereby separating dynamic points and static points in a map containing dynamic scenes, and further completing map segmentation.

BRIEF DESCRIPTION OF DRAWINGS

To describe technical solutions in embodiments of the present disclosure more clearly, the following briefly describes the accompanying drawings required for describing the embodiments. It should be understood that the drawings below only show some embodiments of the present disclosure, and therefore should not be regarded as limiting the protection scope of the present disclosure. In the drawings, similar components use similar numbers.

DETAILED DESCRIPTION

The following clearly and completely describes the technical solutions in the embodiments of the present disclosure with reference to the accompanying drawings in the embodiments of the present disclosure. Apparently, the described embodiments are merely a part rather than all of the embodiments of the present disclosure.

Generally, components of embodiments of the present disclosure described and shown in the accompanying drawings may be arranged and designed in various manners. Therefore, the following detailed description of the embodiments of the present disclosure in the accompanying drawings is not intended to limit the protection scope of the present disclosure, but merely represent selected embodiments of the present disclosure. All other embodiments obtained by a person of ordinary skill in the art based on the embodiments of the present disclosure without creative efforts shall fall within the protection scope of the present disclosure.

Various embodiments of the present disclosure will be described more comprehensively below. The present disclosure may have various embodiments, and adjustments and changes may be made therein. However, it should be understood that the embodiments of the present disclosure are not limited to the specific embodiments disclosed herein, but the present disclosure should be understood as covering all adjustments, equivalents, and/or alternatives falling within the spirit and scope of the embodiments of the present disclosure.

In the following, the terms "include", "have", and their cognates that can be used in the embodiments of the present disclosure are only intended to indicate specific features, numbers, steps, operations, elements, components, or combinations thereof, and should not be understood as first precluding the existence of one or more other features, numbers, steps, operations, elements, components, or combinations thereof or the possibility of adding one or more features, numbers, steps, operations, elements, components, or combinations thereof.

In addition, the terms such as "first", "second", and "third" are used only for the purpose of description and cannot be understood to indicate or imply relative importance.

Unless otherwise defined, all terms (including technical terms and scientific terms) used herein have the same meaning as those commonly understood by those of ordinary skill in the art to which the embodiments of the present disclosure belong. The terms (such as those defined in commonly used dictionaries) will be interpreted as having the same meaning as the contextual meaning in the related technical field, and will not be interpreted as having idealized or overly formal meanings, unless clearly defined in the embodiments of the present disclosure.

Figure 1:
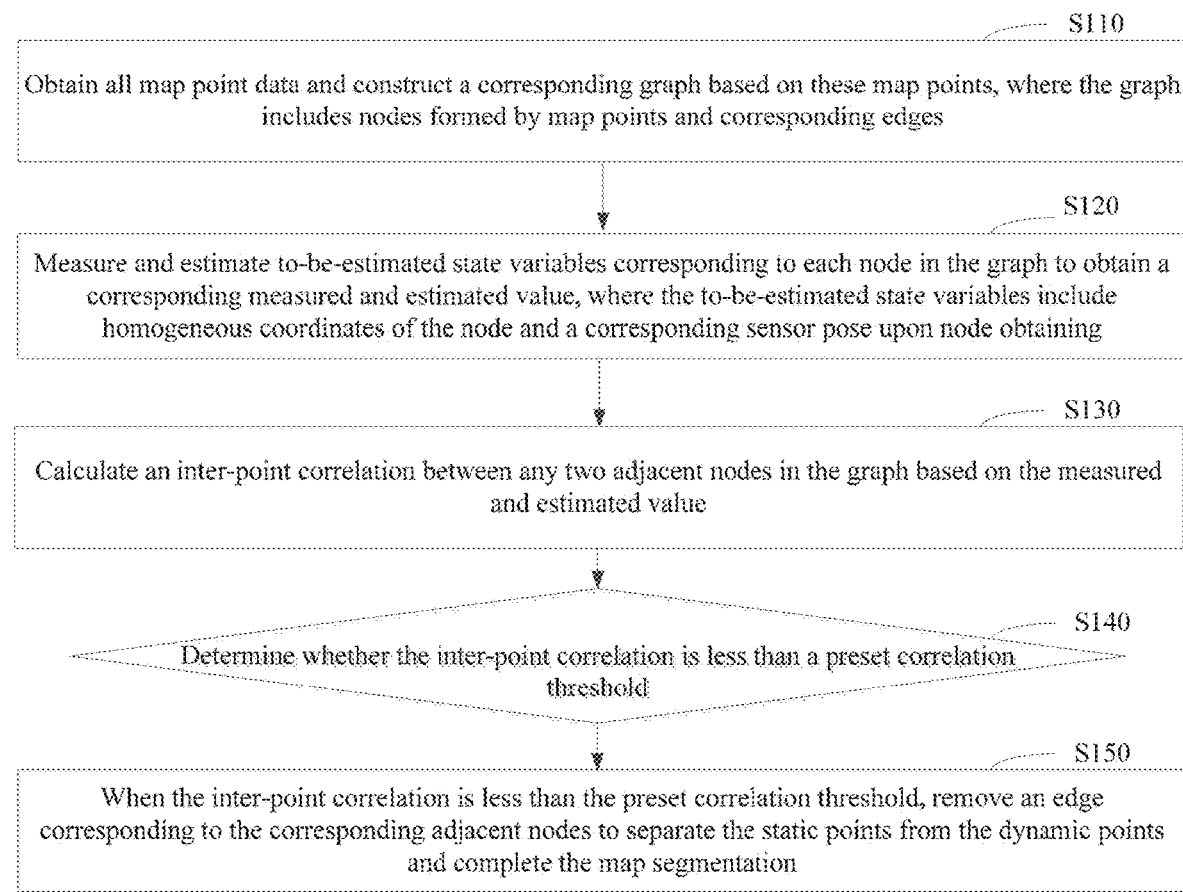
FIG. 1 is a schematic flowchart of a map segmentation method provided in an embodiment.

FIG. 1 is a schematic flowchart of a map segmentation method provided in an embodiment. A map includes static points and dynamic points. The map segmentation method includes the following steps.

Step S110: Obtain all map point data and construct a corresponding graph based on these map points, where the graph includes nodes formed by map points and corresponding edges.

The map point data is three-dimensional map point data. After the map point data is obtained, a map needs to be further constructed to express a correlation between map points. Each edge in the initial map represents a possible correlation between two connected points. Herein, for the convenience of description, a map containing all the edges is denoted as a map G.

There are too many edges in the initial graph G To reduce the calculation complexity, it is necessary to construct a graph to reduce the number of edges, so as to ensure that each point is only connected to a corresponding neighboring point and that information in the initial map G can be reflected to the greatest extent, with the minimal loss.

In an embodiment, the graph is a sparse graph.

Step S120: Measure and estimate to-be-estimated state variables corresponding to each node in the graph to obtain a corresponding measured and estimated value, where the to-be-estimated state variables include homogeneous coordinates of the node and a corresponding sensor pose upon node obtaining.

The homogeneous coordinates of each node in the graph and the corresponding sensor pose upon node obtaining are to-be-estimated state variables. Motions are usually represented by rotation and translation matrices.

The foregoing graph shows a correlation between adjacent nodes at an initial time.

Step S130: Calculate an inter-point correlation between any two adjacent nodes in the graph based on the measured and estimated value.

For any two adjacent nodes in a graph, an edge connecting the two adjacent points usually represents an inter-point correlation between the corresponding points. Therefore, when the measured and estimated value corresponding to the to-be-estimated state variable of each node in the graph is obtained, the inter-point correlation between any two adjacent nodes in the graph may be further calculated based on the measured and estimated value.

Step S140: Determine whether the inter-point correlation is less than a preset correlation threshold.

An edge corresponding to inconsistent adjacent points is removed as a singular value in the iterative process of random consistency sampling. If all observed values of this edge are singular values, the edge is removed from the graph.

A moving object in vision usually causes interference. However, because the dynamic points and static points are uncorrelated, the subsequent step S150 can be triggered by comparing the inter-point correlation with the preset correlation threshold.

Step S150: When the inter-point correlation is less than the preset correlation threshold, remove an edge corresponding to the corresponding adjacent nodes to separate the static points from the dynamic points, so as to complete the map segmentation.

The correlation between dynamic points and static points is low. Therefore, when the inter-point correlation is less than the preset correlation threshold, the edge corresponding to the corresponding adjacent nodes can be removed to separate the static points from the dynamic points, so as to complete the map segmentation.

For map point data containing dynamic scenes, based on the idea that there is a distribution correlation between static points while there is no correlation between dynamic points and static points, the foregoing map segmentation method can construct a graph, calculate an inter-point correlation between adjacent points in the graph, compare the inter-point correlation with a preset correlation threshold, remove an edge corresponding to the adjacent nodes to separate static points from dynamic points, and remove edges between uncorrelated points, so as to complete the map segmentation, laying the foundation for subsequent accurate motion estimation.

Figure 2:
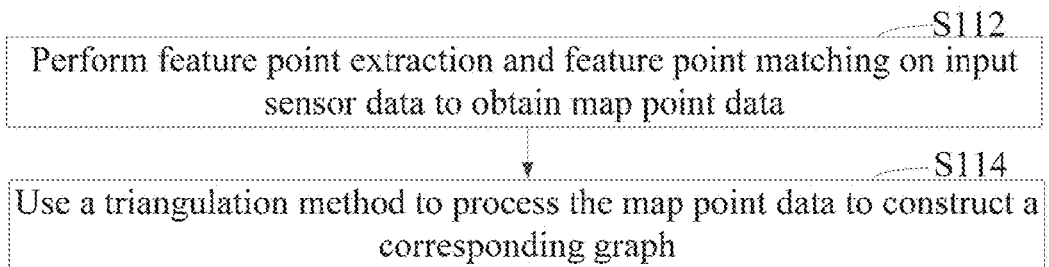
FIG. 2 is a schematic flowchart of a graph obtaining method provided in an embodiment.

In an embodiment, as shown in FIG. 2, step 110 includes the following steps.

Step S112: Perform feature point extraction and feature point matching on input sensor data to obtain corresponding map point data.

The input data varies with sensors. However, usually image frames are input. For an RGB monocular camera, images are input; for an RDB-D camera, images and depth information of each point are input; for a binocular camera, a sequence of left and right images are input, where the input images are arranged as a sequence by time.

A visual feature refers to a feature representation constructed using information such as a pixel gradient size and direction in a local area of an image. Different feature point extraction algorithms can be used to extract feature points from the images to obtain feature point information. For example, a scale-invariant feature transform (SIFT) algorithm or a Fast feature extraction algorithm can be used.

When the feature point information is obtained, feature points of continuous views need to be matched using a descriptor-based method or an optical flow-based method. The descriptor-based method uses vision descriptors such as SIFT and speeded-up robust features (SURF) feature descriptors to obtain a correspondence. Optical flow refers to the instantaneous speed of pixel motion of a spatially moving object on the observation imaging plane. The optical flow method is a method to find a correspondence between a previous frame and a current frame based on changes of pixels in an image sequence in the time domain and a correlation between adjacent frames, so as to calculate motion information of an object between adjacent frames.

Because cameras use different sensor models, three-dimensional conversion processing methods are also different. For example, for a monocular camera, obtained information is projection information obtained after spatial projective transformation; for an RGB-D camera, because depth information of each point is directly obtained, information of each three-dimensional map point can be directly obtained; for a binocular camera, because it has image sequences with the same timestamp at the left and right sides, a stereo vision method can be used for calculation to obtain three-dimensional map point data.

Step S114: Use a triangulation method to process the map point data to construct a corresponding graph.

The triangulation method is used to construct a triangulated topological structure in which a circumscribed circle of each triangle does not contain other points, so that each point is only connected to its neighboring point, and then a graph is constructed. This greatly reduces the subsequent calculation amount, and can reflect the information of the original map G to the greatest extent, with the minimal loss.

In an embodiment, a formula used for measurement is as follows:

$$\begin{cases} y_{ik} = g(X_{ik}) + n_{ik} = s(R(X_{ik})) + n_{ik} \\ R(X_{ik}) = T_k * P_i \\ X_{ik} = \{T_k, P_i\} \end{cases} \quad (1)$$

$y_{ik}$ represents a measured and estimated value corresponding to the i-th map point in the graph at time k; s(.) represents a sensor model; R(.) is used for transformation from a world coordinate system to a sensor coordinate system; $g(X_{ik})=s(R(X_{ik}))$ represents a model observation value obtained when the sensor model is used to observe the i-th map point at time k; $X_{ik}$ represents a to-be-estimated state variable corresponding to the i-th map point at time k; $T_k$ represents a motion of a sensor at time k; $P_i$ represents homogeneous coordinates corresponding to the i-th map point; $n_{ik}$ represents Gaussian noise; $n_{ik}$ meets Gaussian distribution $N(u_{ik}, C_{ik})$; $u_{ik}$ represents a mean value of Gaussian noise; and $C_{ik}$ represents a variance of Gaussian noise, where i and k are both positive integers.

In an embodiment, the foregoing sensor model is a nonlinear sensor model.

In an embodiment, the map segmentation method further includes: when the sensor model is used for observation, using a maximum likelihood estimation method to observe the state variable $X_{ik}$.

In an embodiment, the following calculation formula is used in step S130:

$$\begin{cases} Z_{ijk} = y_{ik} - y_{jk} = h(l_{ijk}) + n_{ijk} \\ h(l_{ijk}) = s(T_k * P_i) - s(T_k * P_j) \end{cases} \quad (2)$$

$Z_{ijk}$ represents an inter-point correlation between the i-th map point and the j-th map point in the graph at time k; $y_{jk}$ represents a measured and estimated value corresponding to the j-th map point in the graph at time k; $l_{ijk}$ represents an edge connecting the i-th map point and the j-th map point at time k; $h(l_{ijk})$ represents a model observation value corresponding to the inter-point correlation between the i-th map point and the j-th map point at time k; $P_j$ represents homogeneous coordinates corresponding to the j-th map point; and $n_{ijk}$ represents noise.

In one embodiment, a method for solving an extreme value of a preset objective function is used to optimize a measurement error of the to-be-estimated state variable and a model observation error of the inter-point correlation. The preset objective function is as follows:

$$\begin{cases} J(X) = \frac{1}{2}\sum_{i,k} e_{y,ik}(X)^T C_{ik}^{-1} e_{y,ik}(X) + \frac{1}{2}\sum_{ij,k} e_{z,ijk}(l_{ijk})^T C_{ijk}^{-1} e_{z,ijk}(l_{ijk}) \\ e_{y,ik}(X) = y_{ik} - g(X_{ik}), e_{z,ijk}(X_g) = Z_{ijk} - h(l_{ijk}) \end{cases} \quad (3)$$

In formula (3), J(X) represents the preset objective function; $e_{y,ik}(X)$ represents the measurement error of the to-be-estimated state variable; $e_{z,ijk}(X_g)$ represents the model observation error of the inter-point correlation; $C_{ijk}$ is a covariance of $Z_{ijk}$; X represents the to-be-estimated state variable; $X_g$ represents homogeneous coordinates in the to-be-estimated state variable; and $C_{ik}$ represents a variance of Gaussian noise, where i and k are both positive integers.

The method for solving an extreme value of a preset objective function is used to optimize the measurement error of the to-be-estimated state variable and the model observation error of the inter-point correlation. This can further realize the accurate observation of the inter-point correlation while accurately observing the to-be-estimated state variable, so that during the optimization, observed values corresponding to inconsistent edges can be removed as singular values in the iterative process of random sampling. If all the observed values of an edge are singular values, the edge needs to be removed from the graph. Because all dynamic points and static points are uncorrelated, the separation of dynamic points and static points is completed after all inconsistent edges are removed through optimization, thereby completing the map segmentation.

Figure 3:
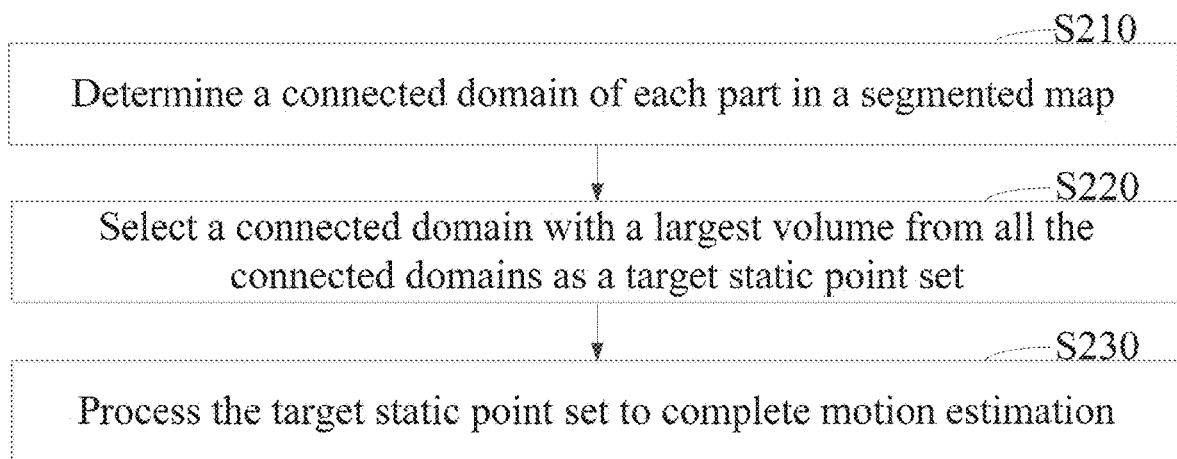
FIG. 3 is a schematic flowchart of a motion estimation method provided in an embodiment.

In addition, as shown in FIG. 3, a motion estimation method is also provided. The motion estimation method adopts any one of the foregoing map segmentation methods, and the motion estimation method further includes the following steps.

Step S210: Determine a connected domain of each part in the segmented map.

After the map is segmented, a connected component corresponding to static points and a connected component corresponding to dynamic points are obtained. Because connected domains of the connected component corresponding to the static points and the connected component corresponding to the dynamic points have different volume characteristics, further screening can be performed based on this feature.

In an embodiment, the connected domain of each part in the segmented map is determined by using a depth-first-search algorithm.

Step S220: Select a connected domain with the largest volume from all the connected domains as a target static point set.

If a plurality of connected domains exist, different connected domains represent sets of points on independent objects in different motion states. In most scenarios, the connected domain with the largest volume in the created map is usually composed of static points. The reasons are as follows: On the one hand, a spatial volume in a static scene is generally large in a local map constructed over a period of time. On the other hand, static points are generally uniformly distributed in the three-dimensional space, while dynamic points on the same object are only distributed on one surface because only one surface of the object can be observed through a camera. Therefore, the volume of the connected domain formed by dynamic points is much smaller than the volume of the connected domain formed by static points.

In this case, the connected domain with the largest volume can be selected from all the connected domains as the target static point set.

Step S230: Process the target static point set to complete motion estimation.

After the target static point set is obtained, a traditional bundle adjustment method can be further used to perform motion estimation and calculation based on the obtained target static point set.

In an embodiment, the bundle adjustment method is used to process the target static point set, to complete the motion estimation.

Based on the idea that there is a distributional correlation between static points while there is no correlation between dynamic points and static points, the motion estimation method uses the foregoing map segmentation method to remove edges between uncorrelated points, so as to separate dynamic points from static points in a map containing dynamic scenes and complete map segmentation to obtain the target static point set; uses the depth-first-search algorithm to determine the connected domain of each part in the segmented map; selects the connected domain with the largest volume from all the connected domains as the target static point set; and uses the bundle adjustment method to process the target static point set, so as to complete the motion estimation. This method overcomes the disadvantage of the reduced estimation accuracy of the vision-based motion estimation method with static environment assumptions due to a moving interfering object in the field of view, and greatly improves the motion estimation accuracy.

Figure 4:
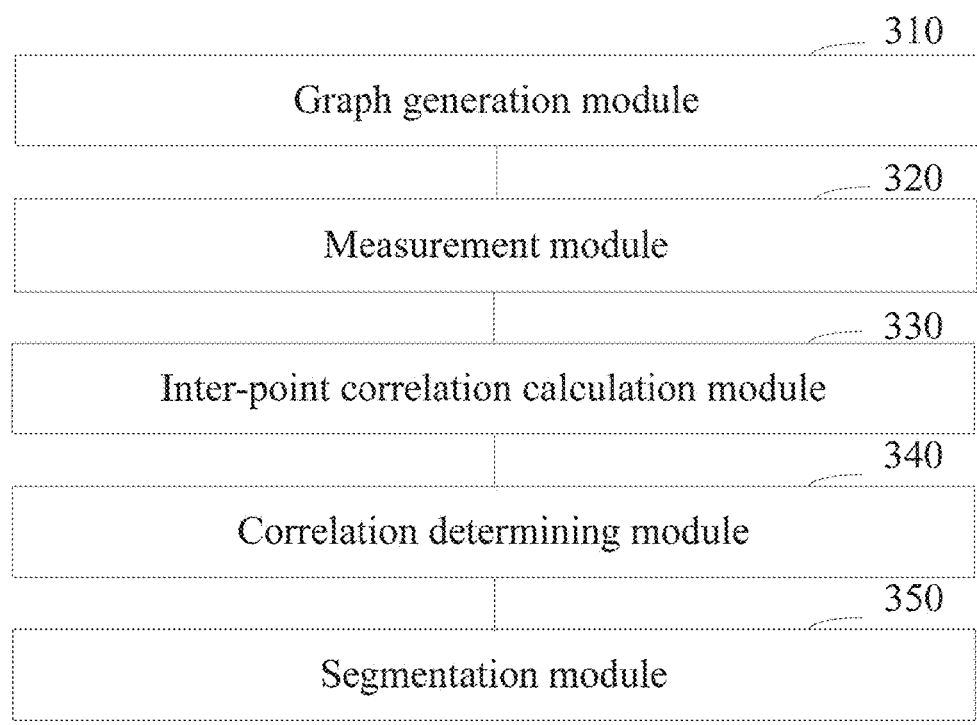
FIG. 4 is a structural block diagram of a map segmentation device provided in an embodiment.

In addition, as shown in FIG. 4, a map segmentation device 300 is also provided. The map segmentation device 300 includes:

a graph generation module 310, configured to obtain all map point data and construct a corresponding graph based on these map points, where the graph includes nodes formed by map points and corresponding edges;

a measurement module 320, configured to measure and estimate to-be-estimated state variables corresponding to each node in the graph to obtain a corresponding measured and estimated value, where the to-be-estimated state variables include homogeneous coordinates of the node and a corresponding sensor pose upon node obtaining;

an inter-point correlation calculation module 330, configured to calculate an inter-point correlation between any two adjacent nodes in the graph based on the measured and estimated value;

a correlation determining module 340, configured to determine whether the inter-point correlation is less than a preset correlation threshold; and a segmentation module 350, configured to: when the inter-point correlation is less than the preset correlation threshold, remove an edge corresponding to the corresponding adjacent nodes to separate the static points from the dynamic points and complete the map segmentation.

In addition, according to various embodiments, a computer, computer system, or device terminal is further provided, including a memory communicatively connected to a processor, where the memory includes one or more memory devices configured to store a computer program, and the processor includes one or more data processing devices that are configured to execute the computer program to enable the computer, computer system, or device terminal to execute any part or all of one or more or all of the methods, processes, or modules described herein.

In addition, a computer-readable or non-transitory computer-readable storage medium is further provided according to various embodiments. The computer-readable or non-transitory computer-readable storage medium stores a computer program, and when being executed by a processor, the computer program executes any part or all of one or more or all of the methods, processes, or modules described herein.

In one example, a robot is equipped with a device terminal using a map segmentation method. A main computing unit of the terminal is an Ubuntu 16.04 laptop computer with an Intel i5 processor, a 4 GB memory, and a 512 MB solid state drive. The terminal uses an ASUS Xtion sensor as an RGB-D sensor, with images and depth maps as inputs. The depth map provides depth information of each map pixel. During robot operation, mapping and localization for a surrounding environment, such as an indoor environment, are implemented by using the images and depth maps input to the RGB-D sensor.

In a specific example, in a normal office environment, two people are moving around, and all other objects remain static during the experiment. First, visual features are extracted from an image. A visual feature refers to a feature representation constructed using information such as a pixel gradient size and direction in a local area of an image. Different feature point extraction algorithms can be used to extract feature points from the images to obtain feature point information. For example, a SIFT algorithm or a Fast feature extraction algorithm can be used. Based on a feature extraction result and the depth map, a three-dimensional measurement value corresponding to the feature point can be obtained. For ease of description, $[a, b, c]^T$ is used to represent a three-dimensional measurement coordinate value of the i-th map point in frame k.

$$y_{ik} = \begin{bmatrix} a \\ b \\ c \end{bmatrix}.$$

Figure 5:
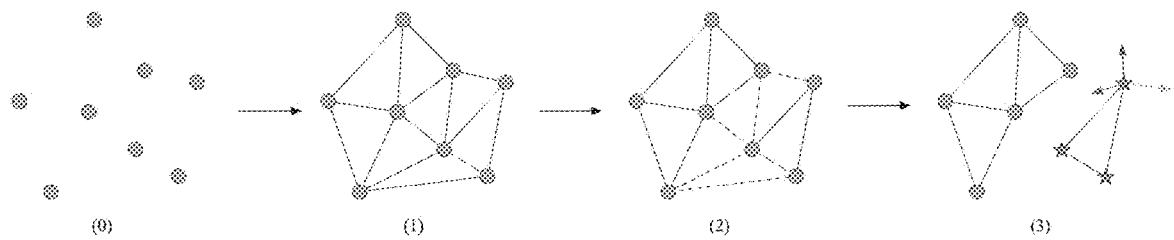
FIG. 5 is a diagram of steps of the map segmentation method.

Initially, points extracted from the static working environment and people are identified as static feature points (as shown in (0) of FIG. 5), and a spatial topology structure is constructed to represent a correlation between the static points (as shown in (1) of FIG. 5).

A three-dimensional point cloud is constructed based on this measurement value. Feature matching is performed between image information provided by the RGB-D sensor and a previous image frame, or a correlation is established between the constructed spatial point cloud and latest data. Assuming that a current data frame is frame k, a to-be-estimated spatial point cloud and all states of each frame corresponding to the sensor information may be expressed as follows:

$$x = \{T_1, \ldots, T_K, p_1, \ldots, p_M\}$$

$T_k$ and $p_i$ are to-be-estimated state variables. A rotation and translation matrix $T_k$, where k=1, ..., K, represents a motion of the sensor at time k. $p_i$, where i=1, ..., M, represents homogeneous coordinates corresponding to the i-th map point. In the RGB-D sensor, a measurement model may be expressed as follows:

$$y_{ik} = \begin{bmatrix} (u - c_u) \times d/f_u \\ (v - c_v) \times d/f_v \\ d \end{bmatrix} = g(x_{ik}) + n_{ik},$$

where (u, v) is projection coordinates of a map point $p_{ik}$, d is a corresponding depth measurement value, ($c_u$, $c_v$) is a principal point of a camera, ($f_u$, $f_v$) is a focal length, and $g(x_{ik})$ is an observation model of the RGB-D sensor, which can be expressed as follows:

$$g(x_{ik}) = s_{RGB-D}(T_k p_i).$$

where $$s_{RGB-D}(\rho) = \begin{bmatrix} 1 & 0 & 0 & 0 \\ 0 & 1 & 0 & 0 \\ 0 & 0 & 1 & 0 \end{bmatrix}$$

ρ, and ρ is a four-dimensional vector.

For calculation of data of frame k, a localization result of the robot is $T_k$. A graph is constructed on an existing map point cloud to present a correlation between map points. Each edge of the initial graph represents a possible correlation between two connected points. An edge between $p_i$ and $p_j$ in the graph is denoted as follows:

$$l_{ij} = \{p_i, p_j\}.$$

The graph containing all edges is denoted as G (as shown in (1) of FIG. 5). To reduce computational complexity, this example uses Delaunay Triangulation to construct a sparse graph to reduce the number of edges. This method can construct a triangular topology structure on the map points, where a circumscribed circle of each triangle does not contain other points. This construction principle ensures that each point is only connected to its adjacent point. A correlation between adjacent points in the initial sparse graph needs to be verified in subsequent steps. The initial sparse graph represents a correlation between adjacent map points at an initial moment. For a motion at time k, an inter-point correlation is expressed as $z_{ijk} = y_{ik} - y_{jk} = h(l_{ijk}) + n_{ijk}$, where $l_{ijk}$ represents an edge connecting points $p_i$ and $p_j$ at time k, $n_{ijk}$ represents noise, and h represents an observation model for inter-point correlation, which is defined as follows:

$$h(l_{ijk}) = s(T_k p_i) - s(T_k p_j))$$

All observations at time k are denoted as follows:

$$z_k = \{z_{ijk}\}_{(ij) \in \mathcal{G}}$$

Observations at all times are denoted as follows:

$$z = \{z_0, \ldots, z_K\}$$

For each observation of each edge $l_{ij}$, an error term is:

$$e_{z,ijk}(x_g) = z_{ijk} - h(l_{ijk}).$$

An objective function can be minimized by optimizing $x_g$:

$$J_p(x_g) = \frac{1}{2} \sum_{ij,k} e_{x,ijk}(1_{ijk})^T C_{ijk}^{-1} e_{x,ijk}(1_{ijk}),$$

During construction of the above objective function, all observation data y can be used to estimate all the above information. Assuming that there is no correlation between map points, an objective function constructed using all observation errors is generally defined as follows:

$$J_{ba}(x) = \frac{1}{2} \sum_{i,k} e_{y,ik}(x)^T C_{ik}^{-1} e_{y,ik}(x),$$

where $e_{y,ik}(x) = y_{ik} - g(x_{ik})$. Based on the above two objective functions, a final objective function can be defined as follows:

$$J(x) = J_p(x_g) + J_{ba}(x).$$

If map point cloud data at time k contains a moving object, a motion estimation result at time k will be affected by the moving object. Because relative positions of a dynamic point and a static point have changed, no edges between these points are found consistent after multiple observations by the camera. In this example, these edges are called inconsistent edges (the dashed edges in (2) of FIG. 5). In the process of optimizing $x_g$, observations corresponding to the inconsistent edges are removed as singular values in the iterative process of optimization. After the optimization is complete, if all observations of an edge are singular values, this edge needs to be deleted from G. Since all dynamic points and static points are not correlated, the dynamic points can be separated from the static points by removing all inconsistent edges. Therefore, when a person sitting on the seat stands up and walks, the method described in this patent can effectively mark feature points of the walking person as dynamic feature points (the pentagon in (3) of FIG. 5).

A feature point marked as a dynamic point is not used for localization. Therefore, feature points involved in localization are all static feature points, thereby ensuring accuracy of the localization in a dynamic environment.

In several embodiments provided in the present disclosure, it should be understood that the disclosed device and system may be implemented in other manners. The device embodiments described above are merely examples. For example, the flowcharts and structural diagrams in the accompanying drawings show the possible implementation architecture, functions, and operations of the devices, methods, and computer program products according to multiple embodiments of the present disclosure. Each block in the flowcharts or block diagrams may represent a module, a program segment, or a part of code, and the module, the program segment, or the part of code contains one or more executable instructions used to implement specified logical functions. It should also be noted that, in alternative implementations, the functions marked in the blocks may occur in an order different from that marked in the drawings. For example, two consecutive blocks can actually be executed in parallel, or sometimes can be executed in the reverse order, depending on the functions involved. It should also be noted that each block in the structural diagrams and/or flowcharts, and a combination of the blocks in the structural diagrams and/or flowcharts can be implemented by using a dedicated hardware-based system that performs specified functions or actions, or can be implemented by using a combination of dedicated hardware and computer instructions.

In addition, all functional modules in the embodiments of the present disclosure may be integrated into one independent part, or each of the modules may exist alone physically, or two or more modules may be integrated into one independent part.

The functions, if implemented in the form of a software functional module and sold or used as a stand-alone product, may be stored in a computer-readable storage medium or non-transitory computer-readable storage medium. Based on such understanding, the technical solution of the present disclosure which is essential or a part contributing to the prior art or a part of the technical solution may be embodied in the form of a software product. The computer software product is stored in a computer-readable or non-transitory computer-readable storage medium and includes a plurality of instructions for enabling a computer device or device system (which may be a smartphone, a personal computer, a server, a network device, or the like) to execute all or some steps of any or all of the methods, processes, or modules, according to various embodiments of the present invention. The foregoing storage medium includes: any medium that can store program code, such as a USB flash disk, a removable hard disk, a read-only memory (ROM), a random access memory (RAM), a magnetic disk, or an optical disc.

The foregoing descriptions are merely specific implementations of the present disclosure, and the protection scope of the present disclosure is not limited thereto. Any modification or replacement easily conceived by those skilled in the art within the technical scope of the present disclosure should fall within the protection scope of the present disclosure.

What is claimed is:

1. A map segmentation method executed by one or more computer devices to segment a map, wherein the map comprises static points and dynamic points, and the map segmentation method comprises:
   obtaining map point data and constructing a corresponding graph based on the map point data, wherein the corresponding graph comprises nodes formed by map points and corresponding edges;
   measuring and estimating to-be-estimated state variables, each to-be-estimated state variable respectively corresponding to each node in the corresponding graph, and each to-be-estimated state variable measured and estimated to obtain a corresponding measured and estimated value, wherein each to-be-estimated state variable comprises homogeneous coordinates of the node and a corresponding sensor pose at a time of obtaining the node;
   calculating an inter-point correlation between any two adjacent nodes of the nodes in the corresponding graph based on the measured and estimated values associated with the two adjacent nodes;
   determining whether the inter-point correlation is less than a preset correlation threshold; and
   removing, in a state in which the inter-point correlation is less than the preset correlation threshold, an edge corresponding to the two adjacent nodes to separate the static points from the dynamic points and complete the map segmentation,
   wherein the inter-point correlation is calculated according to the following formula:

$$\begin{cases} Z_{ijk} = y_{ik} - y_{jk} = h(l_{ijk}) + n_{ijk} \\ h(l_{ijk}) = s(T_k * P_i) - s(T_k * P_j) \end{cases}$$

wherein $Z_{ijk}$ represents the inter-point correlation between the i-th map point and a i-th map point in the corresponding graph at time k; $y_{ik}$ represents the corresponding measured and estimated value corresponding to an i-th map point in the corresponding graph at time k; $y_{jk}$ represents the measured and estimated value corresponding to the i-th map point in the corresponding graph at time k; $l_{ijk}$ represents an edge connecting the i-th map point and the i-th map point at time k; $h(l_{ijk})$ represents a model observation value corresponding to the inter-point correlation between the i-th map point and the i-th map point at time k; $P_j$ represents homogeneous coordinates corresponding to the i-th map point; $n_{ijk}$ represents noise; $s(.)$ represents a sensor model; $T_k$ represents a motion of a sensor at time k; and $P_i$ represents homogeneous coordinates corresponding to the i-th map point.

2. The map segmentation method according to claim 1, wherein the obtaining the map point data and constructing the corresponding graph based on the map point data comprises:
   performing feature point extraction and feature point matching on input sensor data to obtain the map point data; and
   executing a triangulation method to process the map point data to construct the corresponding graph.

3. The map segmentation method according to claim 1, wherein the corresponding measured and estimated value for each node is calculated according to the following formula:

$$\begin{cases} y_{ik} = g(X_{ik}) + n_{ik} = s(R(X_{ik})) + n_{ik} \\ R(X_{ik}) = T_k * P_i \\ X_{ik} = \{T_k, P_i\} \end{cases}$$

wherein $R(.)$ is used for transformation from a world coordinate system to a sensor coordinate system; $g(X_{ik})=s(R(X_{ik}))$ represents a model observation value obtained when the sensor model is used to observe the i-th map point at time k; $X_{ik}$ represents the to-be-estimated state variable corresponding to the i-th map point at time k; $n_{ik}$ represents Gaussian noise; $n_{ik}$ represents Gaussian distribution $N(u_{ik}, C_{ik})$; $u_{ik}$ represents a mean value of Gaussian noise; and $C_{ik}$ represents a variance of Gaussian noise, wherein i and k are both positive integers.

4. The map segmentation method according to claim 3, wherein the map segmentation method further comprises:
   executing, in a state in which the sensor model is used for observation, a maximum likelihood estimation method to observe each to-be-estimated state variable.

5. The map segmentation method according to claim 1, wherein a method for solving an extreme value of a preset objective function is executed to optimize a measurement error of the to-be-estimated state variable corresponding to the i-th map point at time k and to optimize a model observation error of the inter-point correlation between the i-th map point and the j-th map point in the corresponding graph at time k, wherein the preset objective function is as follows:

$$\begin{cases} J(X) = \frac{1}{2} \sum_{i,k} e_{y,ik}(X)^T C_{ik}^{-1} e_{y,ik}(X) + \frac{1}{2} \sum_{ij,k} e_{z,ijk}(l_{ijk})^T C_{ijk}^{-1} e_{z,ijk}(l_{ijk}) \\ e_{y,ik}(X) = y_{ik} - g(X_{ik}), e_{z,ijk}(X_g) = Z_{ijk} - h(l_{ijk}) \end{cases}$$

wherein $J(X)$ represents the preset objective function; $e_{y,ik}(X)$ represents the measurement error of the to-be-estimated state variable corresponding to the i-th map point at time k; $e_{z,ijk}(X_g)$ represents the model observation error of the inter-point correlation between the i-th map point and the j-th map point in the corresponding graph at time k; $C_{ijk}$ is a covariance of $Z_{ijk}$; x represents the to-be-estimated state variable corresponding to the i-th map point at time k; and $X_9$ represents homogeneous coordinates in the to-be-estimated state variable corresponding to the i-th map point at time k.

6. A motion estimation method executed by one or more computer devices, wherein the motion estimation method comprises:
   executing a map segmentation method to segment a map comprising static points and dynamic points, the map segmentation method comprising:
      obtaining map point data and constructing a corresponding graph based on the map point data, wherein the corresponding graph comprises nodes formed by map points and corresponding edges,
      measuring and estimating to-be-estimated state variables, each to-be-estimated state variable respectively corresponding to each node in the corresponding graph, and each to-be-estimated state variable measured and estimated to obtain a corresponding measured and estimated value, wherein each to-be-estimated state variable comprises homogeneous coordinates of the node and a corresponding sensor pose at a time of obtaining the node, calculating an inter-point correlation between any two adjacent nodes of the nodes in the corresponding graph based on the measured and estimated values associated with the two adjacent nodes, determining whether the inter-point correlation is less than a preset correlation threshold, and removing, in a state in which the inter-point correlation is less than the preset correlation threshold, an edge corresponding to the two adjacent nodes to separate the static points from the dynamic points and complete the map segmentation and form a segmented map, wherein the inter-point correlation is calculated according to the following formula:

$$\begin{cases} Z_{ijk} = y_{ik} - y_{jk} = h(l_{ijk}) + n_{ijk} \\ h(l_{ijk}) = s(T_k * P_i) - s(T_k * P_j) \end{cases}$$

wherein $Z_{ijk}$ represents the inter-point correlation between the i-th map point and a i-th map point in the corresponding graph at time k; $y_{ik}$ represents the corresponding measured and estimated value corresponding to an i-th map point in the corresponding graph at time k; $y_{jk}$ represents the measured and estimated value corresponding to the j-th map point in the corresponding graph at time k; $l_{ijk}$ represents an edge connecting the i-th map point and the i-th map point at time k; $h(l_{ijk})$ represents a model observation value corresponding to the inter-point correlation between the i-th map point and the i-th map point at time k; $P_j$ represents homogeneous coordinates corresponding to the i-th map point; $n_{ijk}$ represents noise; s(.) represents a sensor model; $T_k$ represents a motion of a sensor at time k; and $P_i$ represents homogeneous coordinates corresponding to the i-th map point, and wherein the motion estimation method further comprises:

determining a connected domain of each part in the segmented map, each connected domain including a volume;

selecting a connected domain with the largest volume from all the connected domains as a target static point set; and processing the target static point set to complete motion estimation.

7. The motion estimation method according to claim 6, wherein the obtaining the map point data and constructing the corresponding graph based on the map point data comprises:

performing feature point extraction and feature point matching on input sensor data to obtain the map point data; and executing a triangulation method to process the map point data to construct the corresponding graph.

8. The motion estimation method according to claim 6, wherein the corresponding measured and estimated value for each node is calculated according to the following formula:

$$\begin{cases} y_{ik} = g(X_{ik}) + n_{ik} = s(R(X_{ik})) + n_{ik} \\ R(X_{ik}) = T_k * P_i \\ X_{ik} = \{T_k, P_i\} \end{cases}$$

wherein R(.) is used for transformation from a world coordinate system to a sensor coordinate system; $g(X_{ik})=s(R(X_{ik}))$ represents a model observation value obtained when the sensor model is used to observe the i-th map point at time k; $X_{ik}$ represents the to-be-estimated state variable corresponding to the i-th map point at time k; $n_{ik}$ represents Gaussian noise; $n_{ik}$ represents Gaussian distribution $N(u_{ik}, C_{ik})$; $u_{ik}$ represents a mean value of Gaussian noise; and $C_{ik}$ represents a variance of Gaussian noise, wherein i and k are both positive integers.

9. The motion estimation method according to claim 6, wherein the map segmentation method further comprises:

executing, in a state in which the sensor model is used for observation, a maximum likelihood estimation method to observe each to-be-estimated state variable.

10. The motion estimation method according to claim 6, wherein a method for solving an extreme value of a preset objective function is executed to optimize a measurement error of the to-be-estimated state variable corresponding to the i-th map point at time k and to optimize a model observation error of the inter-point correlation between the i-th map point and the j-th map point in the corresponding graph at time k, wherein the preset objective function is as follows:

$$\begin{cases} J(X) = \frac{1}{2}\sum_{i,k} e_{y,ik}(X)^T C_{ik}^{-1} e_{y,ik}(X) + \frac{1}{2}\sum_{ij,k} e_{z,ijk}(l_{ijk})^T C_{ijk}^{-1} e_{z,ijk}(l_{ijk}) \\ e_{y,ik}(X) = y_{ik} - g(X_{ik}), e_{z,ijk}(X_g) = Z_{ijk} - h(l_{ijk}) \end{cases}$$

wherein J(X) represents the preset objective function; $e_{y,ik}(X)$ represents the measurement error of the to-be-estimated state variable corresponding to the i-th map point at time k; $e_{z,ijk}(X_g)$ represents the model observation error of the inter-point correlation between the i-th map point and the j-th map point in the corresponding graph at time k; $C_{ijk}$ is a covariance of $Z_{ijk}$; x represents the to-be-estimated state variable corresponding to the i-th map point at time k; and $X_g$ represents homogeneous coordinates in the to-be-estimated state variable corresponding to the i-th map point at time k.

11. A map segmentation device comprising:

a memory storing a computer program; and a computer processor communicatively connected to the memory and configured by the computer program to segment a map comprising static points and dynamic points, and the computer processor configured by the computer program to comprise:

a graph generation module, configured to construct a corresponding graph based on map point data, wherein the corresponding graph comprises nodes formed by map points and corresponding edges;

a measurement module, configured to measure and estimate to-be-estimated state variables, each to-be-estimated state variable respectively corresponding to each node in the corresponding graph, and each to-be-estimated state variable measured and estimated to obtain a corresponding measured and estimated value, wherein each to-be-estimated state variable comprises homogeneous coordinates of the node and a corresponding sensor pose at a time of obtaining the node;

an inter-point correlation calculation module, configured to calculate an inter-point correlation between any two adjacent nodes of the nodes in the corresponding graph based on the measured and estimated values associated with the two adjacent nodes;
a correlation determining module, configured to determine whether the inter-point correlation is less than a preset correlation threshold; and
a segmentation module, configured to remove, in a state in which the inter-point correlation is less than the preset correlation threshold, an edge corresponding to the two adjacent nodes to separate the static points from the dynamic points and complete the map segmentation, wherein the inter-point correlation is calculated according to the following formula:

$$\begin{cases} Z_{ijk} = y_{ik} - y_{jk} = h(l_{ijk}) + n_{ijk} \\ h(l_{ijk}) = s(T_k * P_i) - s(T_k * P_j) \end{cases}$$

wherein $Z_{ijk}$ represents the inter-point correlation between the i-th map point and a i-th map point in the corresponding graph at time k; $y_{ik}$ represents the corresponding measured and estimated value corresponding to an i-th map point in the corresponding graph at time k; $y_{jk}$ represents the measured and estimated value corresponding to the i-th map point in the corresponding graph at time k; $l_{ijk}$ represents an edge connecting the i-th map point and the i-th map point at time k; $h(l_{ijk})$ represents a model observation value corresponding to the inter-point correlation between the i-th map point and the i-th map point at time k; $P_j$ represents homogeneous coordinates corresponding to the i-th map point; $n_{ijk}$ represents noise; s(.) represents a sensor model; $T_k$ represents a motion of a sensor at time k; and $P_i$ represents homogeneous coordinates corresponding to the i-th map point.

* * * * *